United States Patent
Shafin et al.

(10) Patent No.: US 12,389,326 B2
(45) Date of Patent: Aug. 12, 2025

(54) RESTRICTED TWT WITH ENHANCED MULTI-LINK SINGLE RADIO (EMLSR) OPERATION

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Ahmed Atef Ibrahim Ibrahim, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 18/343,060

(22) Filed: Jun. 28, 2023

(65) Prior Publication Data

US 2023/0345366 A1    Oct. 26, 2023

Related U.S. Application Data

(63) Continuation of application No. 17/933,279, filed on Sep. 19, 2022.
(Continued)

(51) Int. Cl.
*H04W 52/02* (2009.01)
(52) U.S. Cl.
CPC .............................. *H04W 52/0216* (2013.01)
(58) Field of Classification Search
CPC . H04W 84/12; H04W 52/0216; H04W 76/15; H04W 76/11; H04W 48/16;
(Continued)

(56) References Cited

U.S. PATENT DOCUMENTS

2020/0404716 A1   12/2020   Ahn et al.
2021/0007168 A1   1/2021    Asterjadhi et al.
(Continued)

FOREIGN PATENT DOCUMENTS

KR    10-2021-0007881 A    1/2021

OTHER PUBLICATIONS

IEEE P802.11be—D2.0 "Part 11: Wireless LAN Medium Access Control (MAC) and Physical Layer (PHY) Specifications—Amendment 8: Enhancements for extremely high throughput (EHT)" May 2022, 873 pages.
(Continued)

*Primary Examiner* — Khalid W Shaheed
(74) *Attorney, Agent, or Firm* — BROADVIEW IP LAW, PC

(57) ABSTRACT

A non-access point (AP) MLD comprises STAs, each comprising a transceiver that forms a link with a corresponding AP of an AP MLD, and a processor. A restricted TWT (R-TWT) schedule is established on a first link, and a first STA on that link is a member of an R-TWT service period (SP) on that link. A second STA on a second link is not a member of any R-TWT SP on that link that overlaps with the R-TWT SP on the first link. The processor transitions the non-AP MLD into EMLSR operation wherein the first and second links form an EMLSR link pair, determines that a transmission opportunity (TXOP) has begun on the second link, and coordinates between the STAs such that a frame exchange sequence with the AP MLD on the second link during the TXOP does not overlap with the R-TWT SP on the first link.

20 Claims, 12 Drawing Sheets

Related U.S. Application Data

(60) Provisional application No. 63/398,479, filed on Aug. 16, 2022, provisional application No. 63/332,588, filed on Apr. 19, 2022, provisional application No. 63/329,725, filed on Apr. 11, 2022, provisional application No. 63/248,379, filed on Sep. 24, 2021.

(58) Field of Classification Search
CPC ....... H04W 8/24; H04W 76/20; H04W 74/04; H04W 74/00; H04W 88/10
See application file for complete search history.

(56) References Cited

U.S. PATENT DOCUMENTS

| | | | |
|---|---|---|---|
| 2021/0377856 A1* | 12/2021 | Chu | H04W 52/0216 |
| 2022/0029736 A1* | 1/2022 | Chu | H04L 1/0025 |
| 2022/0418022 A1* | 12/2022 | Kneckt | H04L 5/0098 |
| 2023/0247696 A1* | 8/2023 | Nagarajan | H04W 76/15 |
| | | | 370/328 |
| 2023/0262769 A1* | 8/2023 | Sun | H04W 74/0816 |
| | | | 370/329 |

OTHER PUBLICATIONS

International Search Report and Written Opinion issued Jan. 9, 2023 regarding International Application No. PCT/KR2022/014140, 9 pages.

Park, "CC36 Comment Resolution for EMLSR—Part 1", doc.: IEEE 802.11-21/283r1, Aug. 2021, 10 pages.

Ho et al., "11be Spec text for addressing the TBDs of eMLSR", doc.: IEEE 802.11-21/0160r1, Feb. 2021, 4 pages.

IEEE P802.11be—D0.4 "Part 11: Wireless LAN Medium Access Control (MAC) and Physical Layer (PHY) Specifications—Amendment 8: Enhancements for extremely high throughput (EHT)" Mar. 2021, 511 pgs.

Extended European Search Report for EP 22873177.4 by European Patent Office dated Jun. 10, 2025.

IEEE P802.11be/D1.1 "Extremely high throughput (Eht) Mac specification", Draft Standard for Information Technology, Jul. 2021.

\* cited by examiner

| Frame Control | Duration | RA | TA | Broadcast TWT ID | Selected Link ID | FCS |
|---|---|---|---|---|---|---|
| 2 | 2 | 6 | 6 | 1 | 2 | 4 |

Octets

FIG. 13

RESTRICTED TWT WITH ENHANCED MULTI-LINK SINGLE RADIO (EMLSR) OPERATION

CROSS-REFERENCE TO RELATED APPLICATION AND CLAIM OF PRIORITY

This application is a Continuation Application of U.S. patent application Ser. No. 17/933,279 filed on Sep. 19, 2022, which claims priority under 35 U.S.C. § 119(e) to U.S. Provisional Patent Application No. 63/248,379 filed on Sep. 24, 2021, U.S. Provisional Patent Application No. 63/329,725 filed on Apr. 11, 2022, U.S. Provisional Patent Application No. 63/332,588 filed on Apr. 19, 2022, and U.S. Provisional Patent Application No. 63/398,479 filed on Aug. 16, 2022, which are hereby incorporated by reference in their entirety.

TECHNICAL FIELD

This disclosure relates generally to power saving operations for latency-sensitive traffic in wireless communications systems that include multi-link devices. Embodiments of this disclosure relate to methods and apparatuses for facilitating the use of enhanced multi-link single radio operations with target wake time operations in a multi-link device in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT (bTWT) operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

Restricted TWT (rTWT or R-TWT) operation, which is based on broadcast TWT operation, is a feature introduced with a view to providing better support for latency sensitive applications. Restricted TWT offers a protected service period for its member STAs by sending Quiet elements to other STAs in the BSS which are not members of the restricted TWT schedule, where the Quiet interval corresponding to the Quiet element overlaps with the initial portion of the restricted TWT SP. Hence, it gives more channel access opportunity for the restricted TWT member scheduled STAs, which helps latency-sensitive traffic flow.

TWT operation would be essential for efficient power management for MLDs. Broadcast TWT is a special kind of TWT operation where multiple STA can obtain membership of the same TWT schedule. Restricted TWT schedule, a variant of broadcast TWT schedule, can be set for multi-link devices for efficient power management.

The non-AP MLDs in 802.11be can have different capabilities in terms of multi-link operation. Many 802.11be non-AP MLDs may only have a single radio. Enhanced Multi-Link Single Radio (EMLSR) enables a multi-link operation with a single radio. With EMLSR operation, a non-AP MLD can achieve throughput enhancement with reduced latency—a performance close to concurrent dual radio non-AP MLDs.

SUMMARY

Embodiments of the present disclosure provide methods and apparatuses for facilitating the coexistence of TWT operation and EMLSR operation for MLDs in a wireless local area network.

In one embodiment, a non-AP MLD is provided, comprising STAs and a processor operably coupled to the STAs. The STAs each comprise a transceiver configured to form a link with a corresponding AP of an AP MLD. An R-TWT schedule is established for communications on a first one of the links such that a first one of the STAs that operates on the first link is a member of an R-TWT SP on the first link, and a second one of the STAs that operates on a second one of the links is not a member of any other R-TWT SP on the second link that overlaps, in time, with the R-TWT SP on the first link. The processor is configured to transition the non-AP MLD into an EMLSR mode of operation wherein the first link and the second link form an EMLSR link pair, determine that a transmission opportunity (TXOP) has begun on the second link, and coordinate between the STAs such that a frame exchange sequence with the AP MLD on the second link during the TXOP does not overlap, in time, with the R-TWT SP on the first link.

In another embodiment, an AP MLD is provided, comprising APs and a processor operably coupled to the APs. The APs each comprise a transceiver configured to form a link with a corresponding STA of a non-AP MLD. An R-TWT schedule is established for communications on a first one of the links such that a first one of the STAs that operates on the first link is a member of an R-TWT SP on the first link, and a second one of the STAs that operates on a second one of the links is not a member of any other R-TWT SP on the second link that overlaps, in time, with the R-TWT SP on the first link. The processor is configured to determine that the non-AP MLD intends to transition into an EMLSR mode of operation wherein the first link and the second link form an EMLSR link pair, determine that a TXOP has begun on the second link, and coordinate between the APs such that a frame exchange sequence with the non-AP MLD on the second link during the TXOP does not overlap, in time, with the R-TWT SP on the first link.

In another embodiment, a method of wireless communication is provided, performed by a non-AP MLD STAs that each comprise a transceiver configured to form a link with a corresponding AP of an AP MLD, wherein an R-TWT schedule is established for communications on a first one of the links such that a first one of the STAs that operates on the first link is a member of an R-TWT SP on the first link, and a second one of the STAs that operates on a second one of the links is not a member of any other R-TWT SP on the second link that overlaps, in time, with the R-TWT SP on the first link. The method includes the steps of transitioning the non-AP MLD into an EMLSR mode of operation, wherein the first link and the second link form an EMLSR link pair, determining that a TXOP has begun on the second link, and coordinating between the STAs such that a frame exchange sequence with the AP MLD on the second link during the TXOP does not overlap, in time, with the R-TWT SP on the first link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example format of an R-TWT Link Selection frame according to embodiments of the present disclosure.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a non-AP STA affiliated with a non-AP MLD may establish one or more restricted TWT schedules over one or more links between the AP MLD and the non-AP MLD. The present disclosure considers the scenario where a non-AP MLD establishes one or more restricted TWT schedules over a single link between the AP MLD and the non-AP MLD.

Embodiments of the present disclosure further recognize that EMLSR operation introduces a number of conflicts with TWT operation in an MLD due to interactions between the TWT doze state and the listening mode of EMLSR that requires all STAs to be awake, as well as the potential for EMLSR operation to require a link to remain silent while latency-sensitive traffic is scheduled for transmission on that link using TWT operation. Accordingly, embodiments of the present disclosure provide apparatuses and methods that facilitate the coexistence of TWT operation and EMLSR operation for MLDs in a wireless local area network.

It is understood that because R-TWT is a subset of TWT, any of the procedures discussed herein below with respect to R-TWT will work with non-restricted TWT. Although the goal of R-TWT (protecting latency-sensitive traffic) is served by reducing signaling overhead, it is understood that reducing signaling overhead is beneficial regardless of whether traffic is latency-sensitive, and therefore the embodiments of the present disclosure are desirable for TWT operation modes that do not necessarily involve latency-sensitive traffic.

Figure 1:
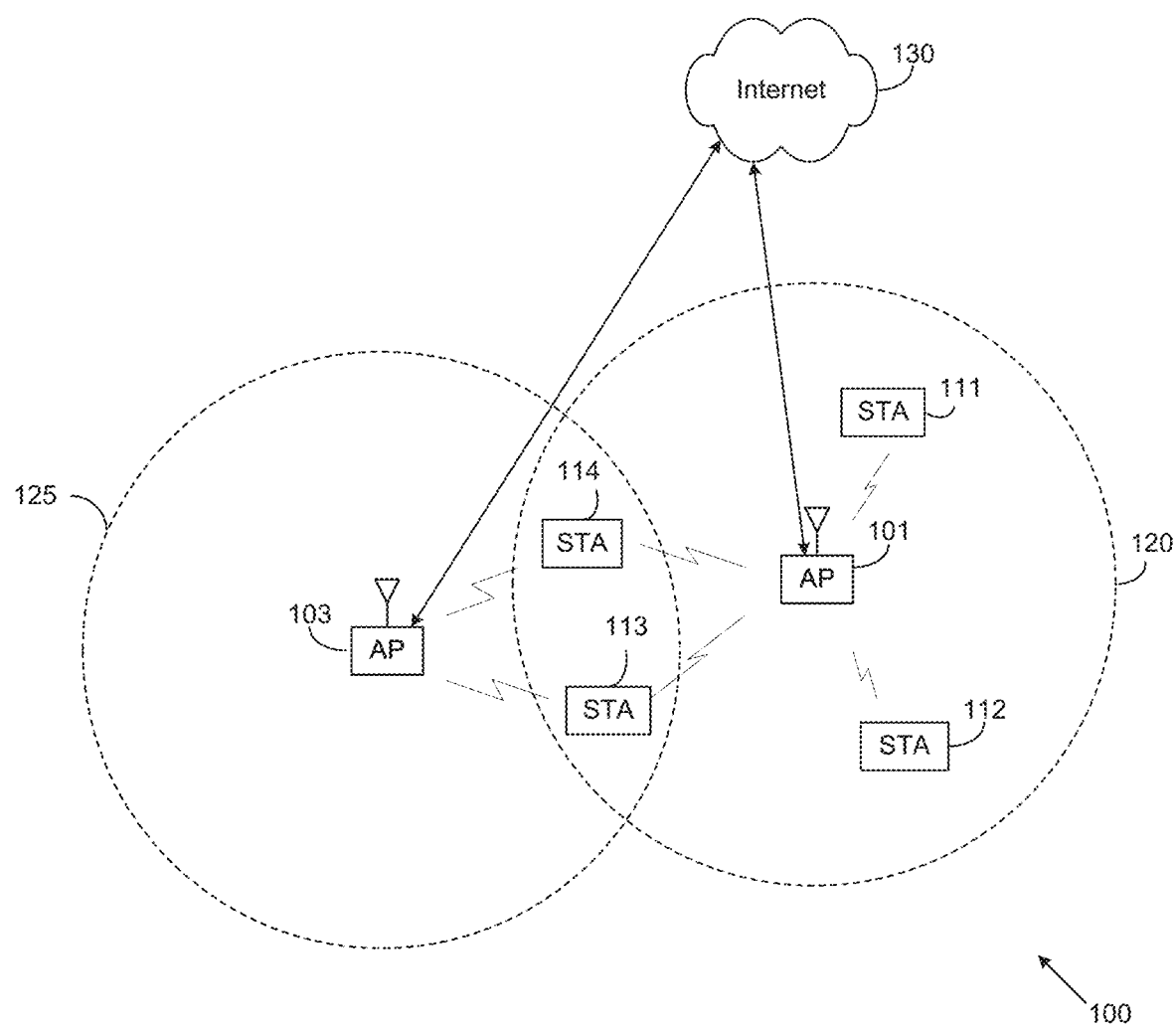
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the coexistence of TWT operation and EMLSR operation for MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
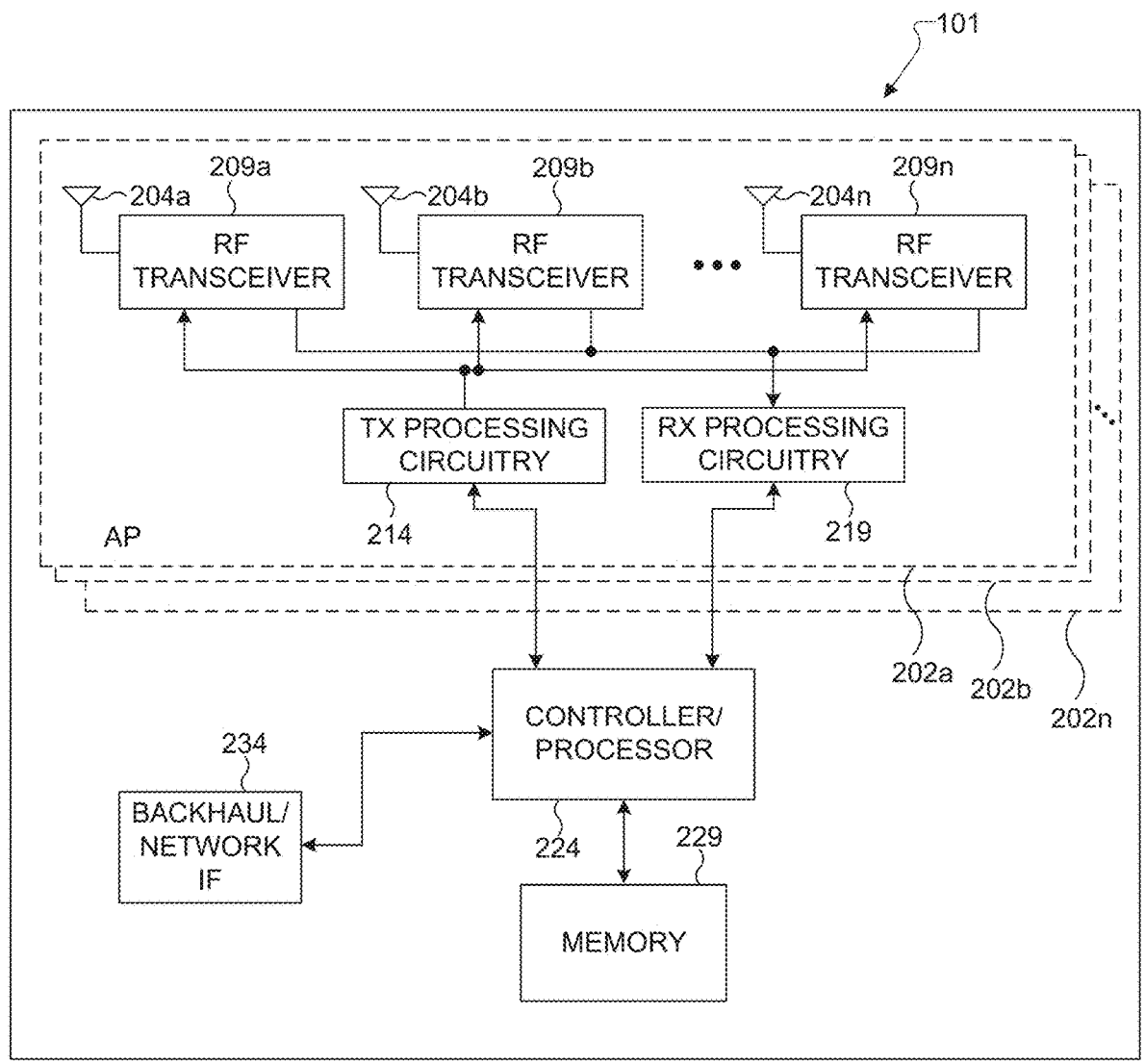
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the coexistence of TWT operation and EMLSR operation for MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the coexistence of TWT operation and EMLSR operation for MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
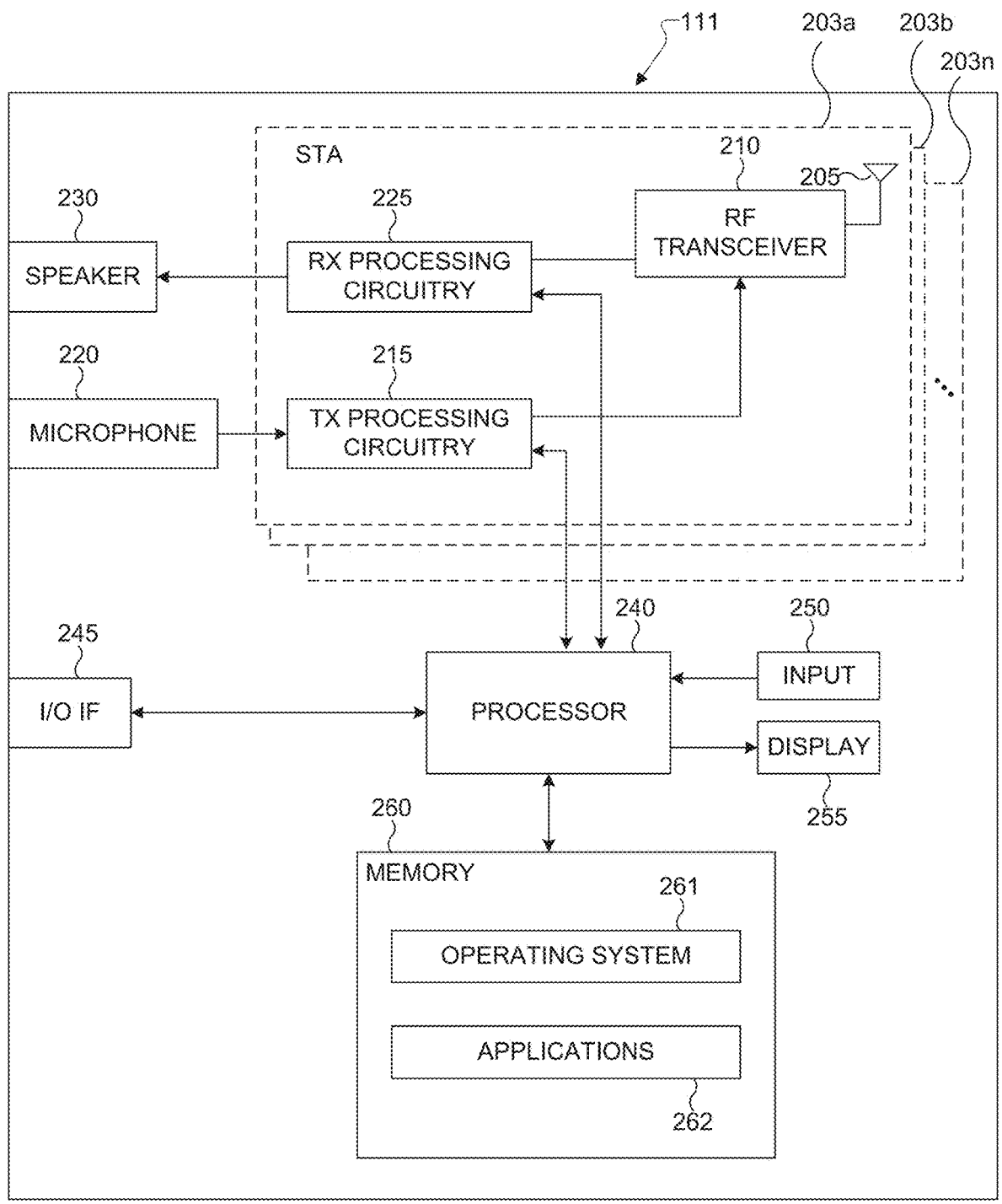
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the coexistence of TWT operation and EMLSR operation for MLDs in WLANs. In some embodiments, the controller/processor 240 includes at least one microprocessor or microcontroller.

The controller/processor 240 is also capable of executing other processes and programs resident in the memory 260, such as operations for facilitating the coexistence of TWT operation and EMLSR operation for MLDs in WLANs. The controller/processor 240 can move data into or out of the memory 260 as required by an executing process. In some embodiments, the controller/processor 240 is configured to execute a plurality of applications 262, such as applications for facilitating the coexistence of TWT operation and EMLSR operation for MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

EMLSR operation and the behavior of STAs affiliated with the non-AP MLD during EMLSR mode of operation are defined in 802.11be standards. If a non-AP MLD intends to operate in EMLSR mode with its associated AP MLD, a STA affiliated with the non-AP MLD sends an EML Operating Mode Notification frame to its associated AP affiliated with the AP MLD, where the EMLSR Mode subfield in EML Control field in the EML Operating Mode Notification frame is set to 1.

Upon receiving the EML Operating Mode Notification frame from the non-AP MLD, the AP MLD can send, on any enabled link between the AP MLD and the non-AP MLD, another EML Operating Mode Notification frame, where the EMLSR Mode subfield in the EML Control field in the EML Operating Mode Notification frame is set to 1. The AP affiliated with the AP MLD is expected to send the EML Operating Mode Notification frame in response to the EML Operating Mode Notification frame sent by the STA affiliated with the non-AP MLD within the timeout interval indicated in the Transition Timeout subfield in the EML Capabilities subfield in the Basic Variant Multi-Link element that is most recently exchanged between the AP MLD and the non-AP MLD.

The non-AP MLD transitions to EMLSR mode either immediately after receiving the EML Operating Mode Notification frame with EMLSR Mode subfield in EML Control field set to 1 from the AP affiliated with the AP MLD, or immediately after the timeout interval indicated in the Transition Timeout subfield in EML Capabilities field in the Basic Variant Multi-Link element elapses after the end of the last PPDU contained in the EML Operating Mode Notification frame transmitted by the non-AP MLD, whichever occurs first. Upon transitioning into EMLSR mode of operation, all STAs affiliated with the non-AP MLD transition into active mode (listening mode).

Figure 3:
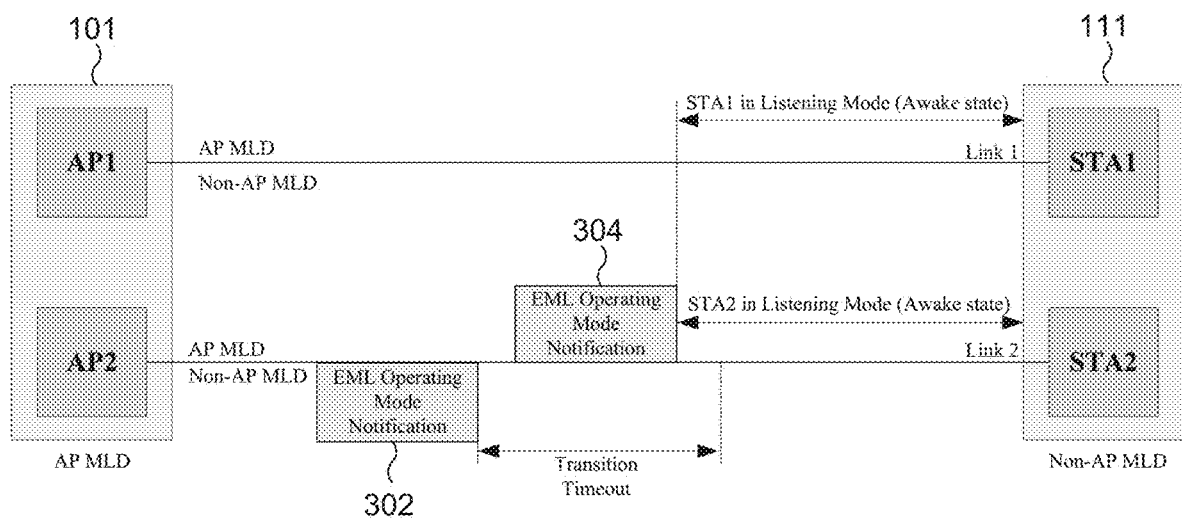
FIG. 3 illustrates an example of a non-AP MLD transitioning into EMLSR mode according to embodiments of the present disclosure.

FIG. 3 illustrates an example of a non-AP MLD transitioning into EMLSR mode according to embodiments of the present disclosure. The AP MLD may be an AP MLD 101, and the non-AP MLD may be a non-AP MLD 111. Although the AP MLD 101 is illustrated with two affiliated APs and the non-AP MLD 111 is illustrated with two affiliated non-AP STAs, it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In this example, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. In this example both Link 1 and Link 2 are enabled links.

The non-AP MLD intends to transition into EMLSR mode, and accordingly STA2 sends to AP2 over Link 2 an EML Operating Mode Notification frame 302 with EMLSR Mode subfield in EML Control field set to 1. In response to the EML Operating Mode Notification frame 302 transmitted by the non-AP MLD, AP2 sends to STA2 another EML Operating Mode Notification frame 304 with EMLSR Mode subfield in EML Control field set to 1. After receiving the EML Operating Mode Notification frame 304 from the AP MLD, the non-AP MLD transitions into EMLSR mode, and both STA1 and STA2 transition into listening mode.

As described above, when a non-AP MLD transitions into EMLSR mode, all STAs affiliated with the non-AP MLD must transition into listening mode (i.e., an awake state or active state, referred to below as the awake state for simplicity). However, this mandate of transitioning all links into the awake state is not conducive to power saving operations such as TWT operations (individual TWT, broadcast TWT, or restricted TWT) established on any of the enabled links between the AP MLD and the non-AP MLD.

For example, when one or more TWT agreements or TWT schedules are established on a link between an AP MLD and a non-AP MLD, if all links are required to transition into the awake state due to the non-AP MLD transitioning into the EMLSR mode of operation, then TWT operation for the STA affiliated with the AP MLD on the link on which the one or more TWT agreements or schedules have been established may be disrupted since that STA may be in the TWT doze state according to the TWT agreement or schedule, but EMLSR operation requires the STA to be in the awake state—these two actions are contradictory.

If the AP MLD sends the initial control frame for EMLSR operation on the link on which the non-AP MLD is in the TWT doze state based on the TWT agreement/schedule, then the STA affiliated with the non-AP MLD and operating on that link won't be able to receive the initial control frame. Accordingly, a subsequent frame exchange sequence on that link won't be possible.

Figure 4:
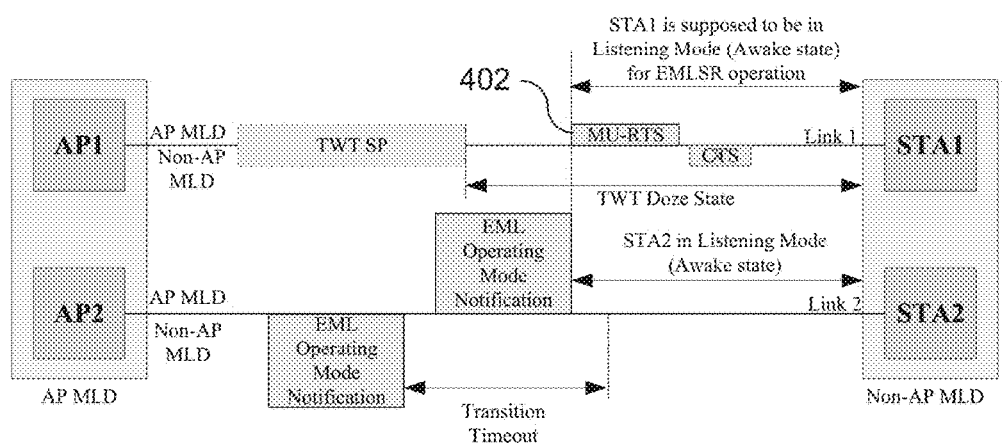
FIG. 4 illustrates an example conflict between the TWT doze state and the listening mode of EMLSR operation according to embodiments of the present disclosure.

FIG. 4 illustrates an example conflict between the TWT doze state and the listening mode of EMLSR operation according to embodiments of the present disclosure. In this example, AP1 and AP2 are two APs affiliated with the AP MLD. Also, STA1 and STA2 are two non-AP STAs affiliated with the non-AP MLD. Two links are set up between the AP MLD and the non-AP MLD—Link 1 between AP1 and STA1, and Link 2 between AP2 and STA2. In this example, both Link 1 and Link 2 are enabled links. Moreover, a TWT agreement/schedule is established on Link 1.

The non-AP MLD of FIG. 4 intends to transition into EMLSR mode, and accordingly STA2 sends to AP2 over Link 2 an EML Operating Mode Notification frame with EMLSR Mode subfield in EML Control field set to 1. In response to the EML Operating Mode Notification frame transmitted by the non-AP MLD, AP2 sends to STA2 another EML Operating Mode Notification frame with EMLSR Mode subfield in EML Control field set to 1. After receiving the EML Operating Mode Notification frame from the AP MLD, the non-AP MLD transitions into EMLSR mode, at which point both STA1 and STA2 are supposed to transition into listening mode (the awake state), as in the example of FIG. 3.

In the example of FIG. 4, however, based on the established TWT agreement/schedule, STA2 is also expected to be in the TWT doze state on Link 1 while the EMLSR operation dictates that STA1 be in listening mode. If the AP MLD sends the EMLSR initial control frame 402 (such as MU-RTS or BSRP) on Link 1, STA1 won't be able to receive it since STA1 is in the TWT doze state due to its TWT operation. This is also in contradiction with the current 802.11be specification, which dictates that it is mandatory for the non-AP MLD to be able to listen (i.e., to be in the awake state) on all links for performing clear channel assessment (CCA) or receiving the initial control frame 402.

In another example, when a non-AP MLD is operating in EMLSR mode and a frame exchange sequence is taking place on one of the enabled links (e.g., the second link) between the AP MLD and a non-AP MLD, if a TWT schedule or agreement is set up over another link (e.g., the first link) between the same AP MLD and the same non-AP MLD, and if the TWT SP on the first link overlaps in time with the frame exchange sequence taking place on the second link, then the STA affiliated with the non-AP MLD that is operating on the first link is not able to transmit or receive any frames even though that STA is in the awake state during the TWT SP, since during EMLSR operation only one link is able transmit or receive at any given time instant. This may disrupt the TWT operation on the first link.

Figure 5:
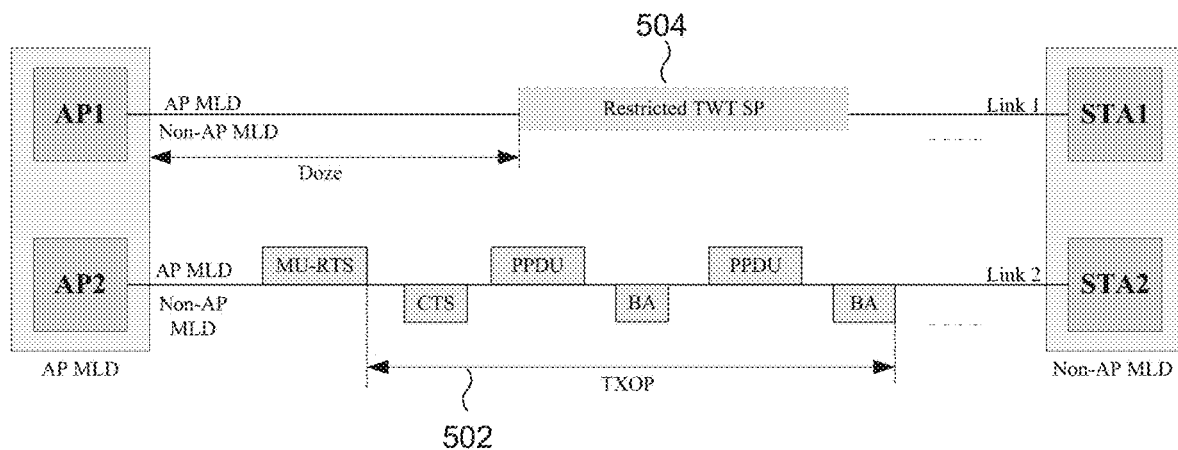
FIG. 5 illustrates an example of disruption of TWT operation on one link during EMLSR operation on another link according to embodiments of the present disclosure.

FIG. 5 illustrates an example of disruption of TWT operation on one link during EMLSR operation on another link according to embodiments of the present disclosure. In this example, AP1 and AP2 are two APs affiliated with the AP MLD. Also, STA1 and STA2 are two non-AP STAs affiliated with the non-AP MLD. Two links are set up between the AP MLD and the non-AP MLD—Link 1 between AP1 and STA1, and Link 2 between AP2 and STA2. In this example both Link 1 and Link 2 are enabled links. Moreover, a restricted TWT agreement/schedule is established on Link 1.

The non-AP MLD of FIG. 5 is already operating in EMLSR mode, and a frame exchange sequence starts on Link 2 between AP2 and STA2 during TXOP 502. During the frame exchange sequence on Link 2, the restricted TWT SP 504 starts on Link 1. However, since STA1 is not supposed to transmit or receive any frames on Link 1 while the non-AP MLD is operating in EMLSR mode and is exchanging frames on another link (Link 2), STA1's UL/DL latency-sensitive traffic cannot be transmitted utilizing the restricted TWT SP 504. This, in turn, affects non-AP MLD's latency-sensitive applications.

Various embodiments of the present disclosure herein below provide mechanisms and necessary rules for enabling the coexistence of TWT operation with the EMLSR operating mode for scenarios such as those illustrated in FIGS. 4 and 5.

According to one embodiment for the scenario in which a TWT agreement or a TWT schedule is established on a link between an AP MLD and a non-AP MLD, if the non-AP MLD transitions into EMLSR mode of operation, then the link over which the TWT agreement or schedule has been established is exempt from the requirement of being in listening mode if the STA affiliated with the non-AP MLD that is operating on that link is scheduled to be in the doze state according to the established TWT agreement or TWT schedule. According to this embodiment, the AP MLD does not send the EMLSR initial control frame (MU-RTS, BSRP, etc.) over the link on which the associated STA is supposed to be in the doze state based on the existing TWT agreement or schedule established on that link, as the AP MLD has knowledge of the TWT agreement or schedule established on that link. That is, the AP MLD does not initiate a frame exchange over the link on which the associated STA is supposed to be in the doze state.

Figure 6:
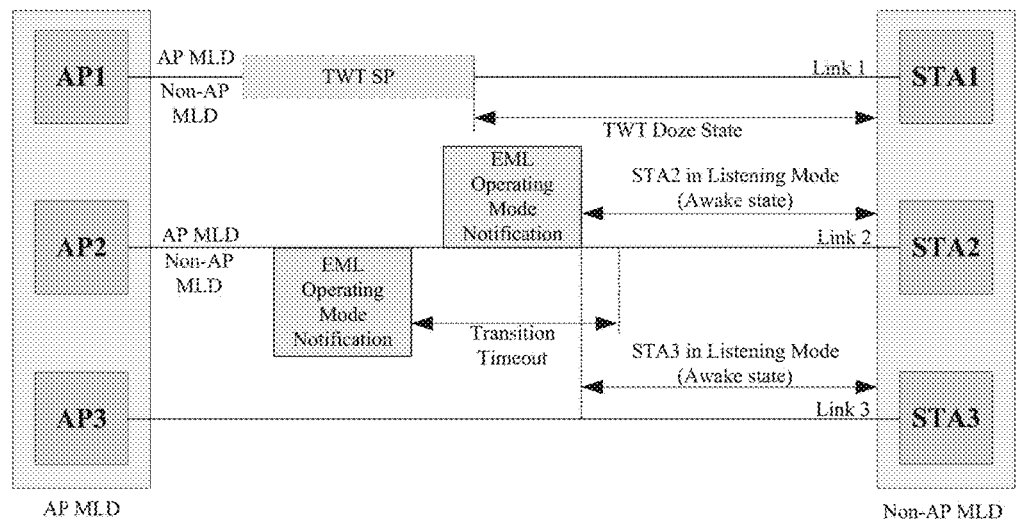
FIG. 6 illustrates an example of exemption of a link from EMLSR listening mode according to embodiments of the present disclosure.

FIG. 6 illustrates an example of exemption of a link from EMLSR listening mode according to embodiments of the present disclosure. In this example, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD—Link 1 between AP1 and STA1, Link 2 between AP2 and STA2, and Link 3 between AP3 and STA3. In this example Link 1, Link 2, and Link 3 are enabled links. A TWT agreement/schedule is established on Link 1.

The non-AP MLD of FIG. 6 intends to transition into EMLSR mode, and accordingly STA2 sends to AP2 over Link 2 an EML Operating Mode Notification frame with EMLSR Mode subfield in EML Control field set to 1. In response to the EML Operating Mode Notification frame transmitted by the non-AP MLD, AP2 sends to STA2 another EML Operating Mode Notification frame with EMLSR Mode subfield in EML Control field set to 1. After receiving the EML Operating Mode Notification frame from the AP MLD, the non-AP MLD transitions into EMLSR mode, and both STA2 and STA3 transition into listening mode. However, following the established TWT agreement/schedule, STA1 remains in the doze state on Link 1. Accordingly, for EMLSR frame exchanges, the AP MLD sends the initial control frame on either Link 2 or Link 3, and not on Link 1.

Figure 7:
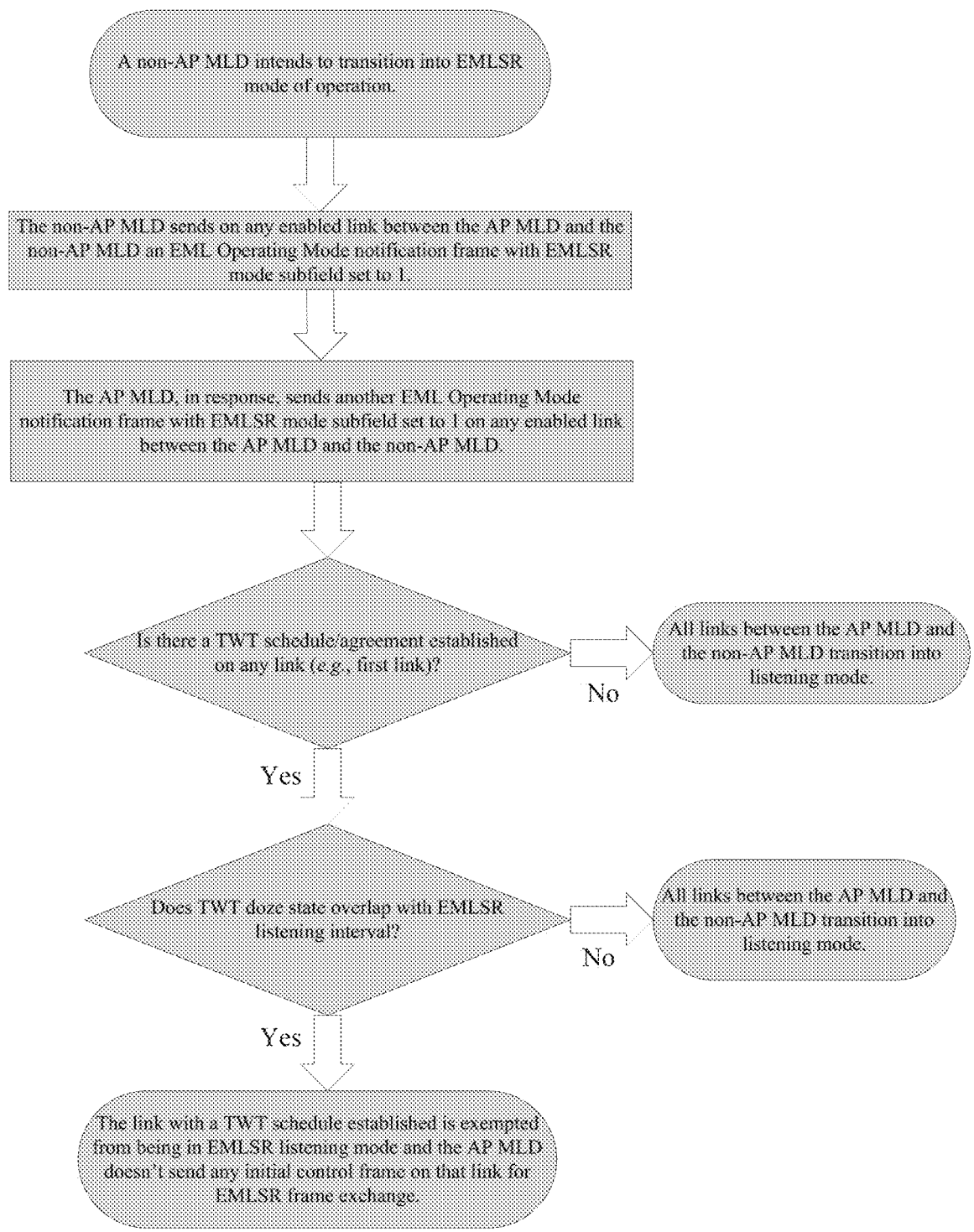
FIG. 7 illustrates an example process for determining whether to exempt a link from EMLSR listening mode according to embodiments of the present disclosure.

FIG. 7 illustrates an example process for determining whether to exempt a link from EMLSR listening mode according to embodiments of the present disclosure. The process of FIG. 7 is one example of a process that may be used to determine whether to allow Link 1 of FIG. 6 to be exempt from EMLSR listening mode.

According to another embodiment for the scenario in which a TWT agreement or a TWT schedule is established on a link between an AP MLD and a non-AP MLD, if the non-AP MLD transitions into EMLSR mode of operation, then the link over which the TWT agreement or schedule has been established can still transition into the EMLSR listening mode if the TWT SP for the STA affiliated with the non-AP MLD that is operating on that link overlaps in time either with the end of the EML Operating Mode Notification frame sent by an AP affiliated with the AP MLD in response to an EML Operating Mode Notification frame sent by another STA affiliated with the same non-AP MLD, or with the end of a timeout duration indicated in the Transition Timeout subfield in EML Capabilities subfield in the Basic Variant Multi-Link element, whichever occurs first. According to some embodiments, the STA affiliated with the non-AP MLD that is operating on that link stays in the listening mode until the TWT SP for that STA ends.

Figure 8:
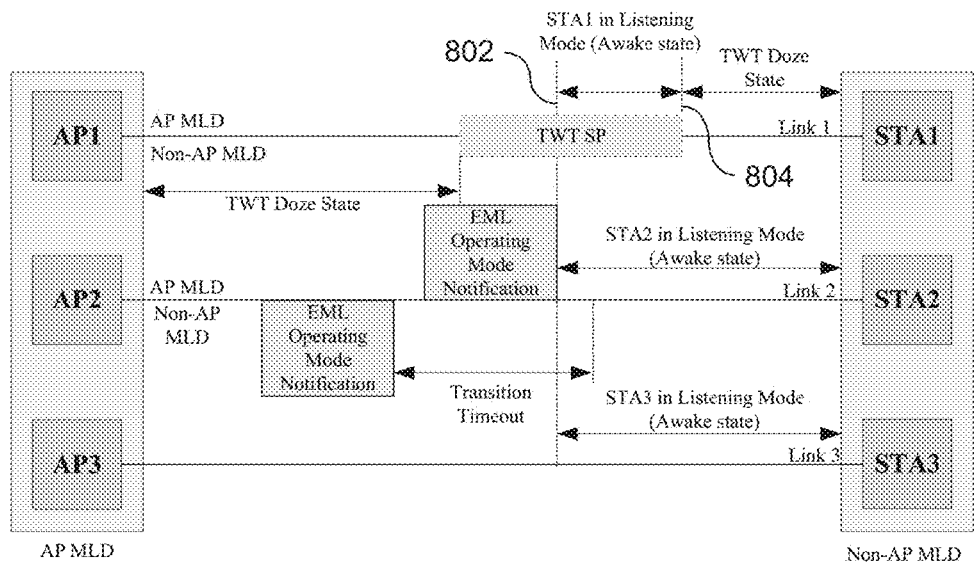
FIG. 8 illustrates an example of implementing EMLSR listening mode during a TWT SP on a link according to embodiments of the present disclosure.

FIG. 8 illustrates an example of implementing EMLSR listening mode during a TWT SP on a link according to embodiments of the present disclosure. In FIGS. 8, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD—Link 1 between AP1 and STA1, Link 2 between AP2 and STA2, and Link 3 between AP3 and STA3. In this example Link 1, Link 2, and Link 3 are enabled links. A TWT agreement/schedule is established on Link 1.

The non-AP MLD of FIG. 8 intends to transition into EMLSR mode, and accordingly STA2 sends to AP2 over Link 2 an EML Operating Mode Notification frame with EMLSR Mode subfield in EML Control field set to 1. In response to the EML Operating Mode Notification frame transmitted by the non-AP MLD, AP2 sends to STA2 another EML Operating Mode Notification frame with EMLSR Mode subfield in EML Control field set to 1.

At the end of the EML Operating Mode Notification frame received from the AP MLD (at time 802), STA1 is in the awake state during the TWT SP based on the TWT agreement or schedule established on that link. Accordingly, at time 802, after receiving the EML Operating Mode Notification frame from the AP MLD, the non-AP MLD transitions into EMLSR mode, and STA1, STA2, and STA3 transition into listening mode. However, STA1 remains in listening mode only until its TWT SP end time (time 804), after which STA1 transitions into the TWT doze state.

According to another embodiment for the scenario in which a TWT agreement or a TWT schedule is established on a link between an AP MLD and a non-AP MLD, if the non-AP MLD transitions into EMLSR mode of operation, even if the link over which the TWT agreement or schedule has been established is in listening mode because of the corresponding STA that is operating on that link being in the awake state during the TWT SP, the AP MLD does not send the EMLSR initial control frame on that link if the AP MLD determines that the remaining time in the TWT SP on that link is not sufficient for completing a subsequent frame exchange sequence. Otherwise, the AP MLD can initiate the frame exchange sequence on that link.

Figure 9:
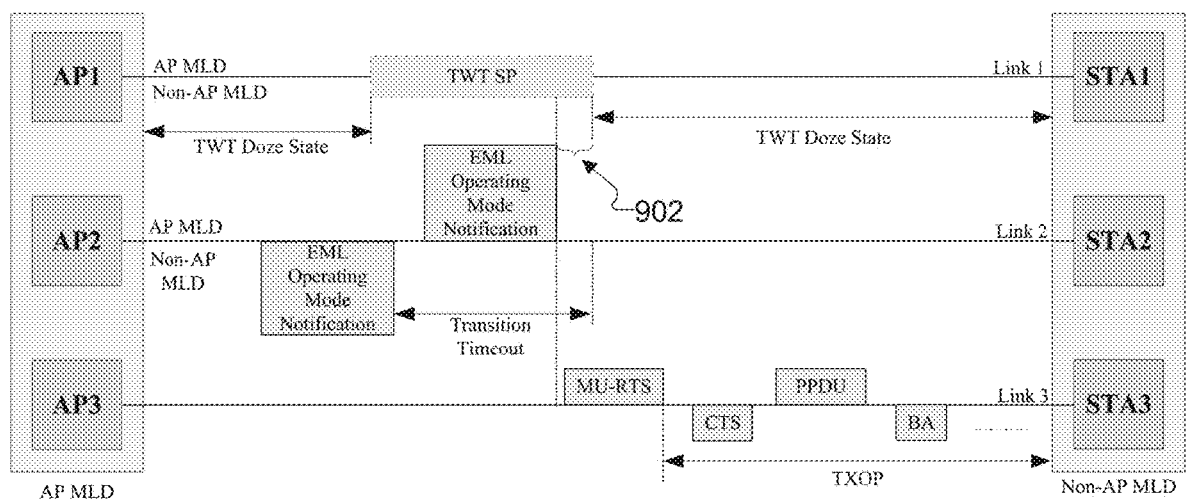
FIG. 9 illustrates an example of avoiding initiating a frame exchange sequence during a TWT SP on a link based on the remaining duration of the TWT SP according to embodiments of the present disclosure.

FIG. 9 illustrates an example of avoiding initiating a frame exchange sequence during a TWT SP on a link based on the remaining duration of the TWT SP according to embodiments of the present disclosure. In this example, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD—Link 1 between AP1 and STA1, Link 2 between AP2 and STA2, and Link 3 between AP3 and STA3. In this example Link 1, Link 2, and Link 3 are enabled links. A TWT agreement/schedule is established on Link 1.

The non-AP MLD of FIG. 9 intends to transition into EMLSR mode, and accordingly STA2 sends to AP2 over Link 2 an EML Operating Mode Notification frame with EMLSR Mode subfield in EML Control field set to 1. In response to the EML Operating Mode Notification frame transmitted by the non-AP MLD, AP2 sends to STA2 another EML Operating Mode Notification frame with EMLSR Mode subfield in EML Control field set to 1.

At the end of the EML Operating Mode Notification frame received from the AP MLD, STA1 is in the awake state during the TWT SP based on the TWT agreement or schedule established on that link. After receiving the EML Operating Mode Notification frame from the AP MLD, the non-AP MLD transitions into EMLSR mode, and STA1, STA2, and STA3 transition into listening mode. However, the remaining time 902 in the TWT SP is too short and is not sufficient, as determined by the AP MLD, for completing an intended frame exchange sequence with STA1. Accordingly, AP MLD doesn't consider Link 1 as a viable option for frame exchanges under EMLSR operation, and chooses either Link 2 or Link 3 for EMLSR frame exchange sequence (Link 3 is chosen in this example).

According to some embodiments, a subset of enabled links, namely an EMLSR Link Set, can be defined. An EMLSR Link Set indicates a set of enabled links on which EMLSR operation is carried on, i.e., an EMLSR frame exchange sequence can be carried on only on one of the links that is listed in the EMLSR Link Set.

According to one such embodiment, during EMLSR operation, an enabled link between an AP MLD and a non-AP MLD that is not listed in EMLSR Link Set can operate independently of the EMLSR operation over the links listed in EMLSR Link Set. According to this embodiment, at any given instant, there can be multiple transmit/receive capable links during EMLSR mode operation—one transmit/receive link chosen from EMLSR link set, and one or more transmit/receive link(s) from the non-EMLSR links (i.e., the enabled links that are not listed in the EMLSR Link Set).

According to another such embodiment, during EMLSR operation, an enabled link between an AP MLD and a non-AP MLD that is not listed in EMLSR Link Set remains in doze state during the entirety of the EMLSR operation. According to this embodiment, at any given moment, there is just one transmit/receive capable link in the entire non-AP MLD under EMLSR mode, and the link for transmit/receive is chosen from the links listed in EMLSR Link Set.

According to yet another such embodiment, for the scenario where a TWT agreement or a TWT schedule is established on a link between an AP MLD and a non-AP MLD, if the non-AP MLD transitions into EMLSR mode of operation, the link over which the TWT agreement or schedule has been established is not included in the EMLSR Link Set.

According to other embodiments, for the scenario in which a non-AP MLD is operating in EMLSR mode and a frame exchange sequence is taking place on one of the enabled links (e.g., the second link) between the AP MLD and the non-AP MLD, if a TWT schedule/agreement is set up over another link (e.g., the first link) between the same AP MLD and the non-AP MLD, where the TWT SP on the first link overlaps in time with the frame exchange sequence taking place on the second link, the AP MLD ends the frame exchange sequence on the second link before the TWT SP starts on the first link. The non-AP MLD can also end the TXOP if a STA affiliated with the non-AP MLD is the TXOP holder.

Figure 10:
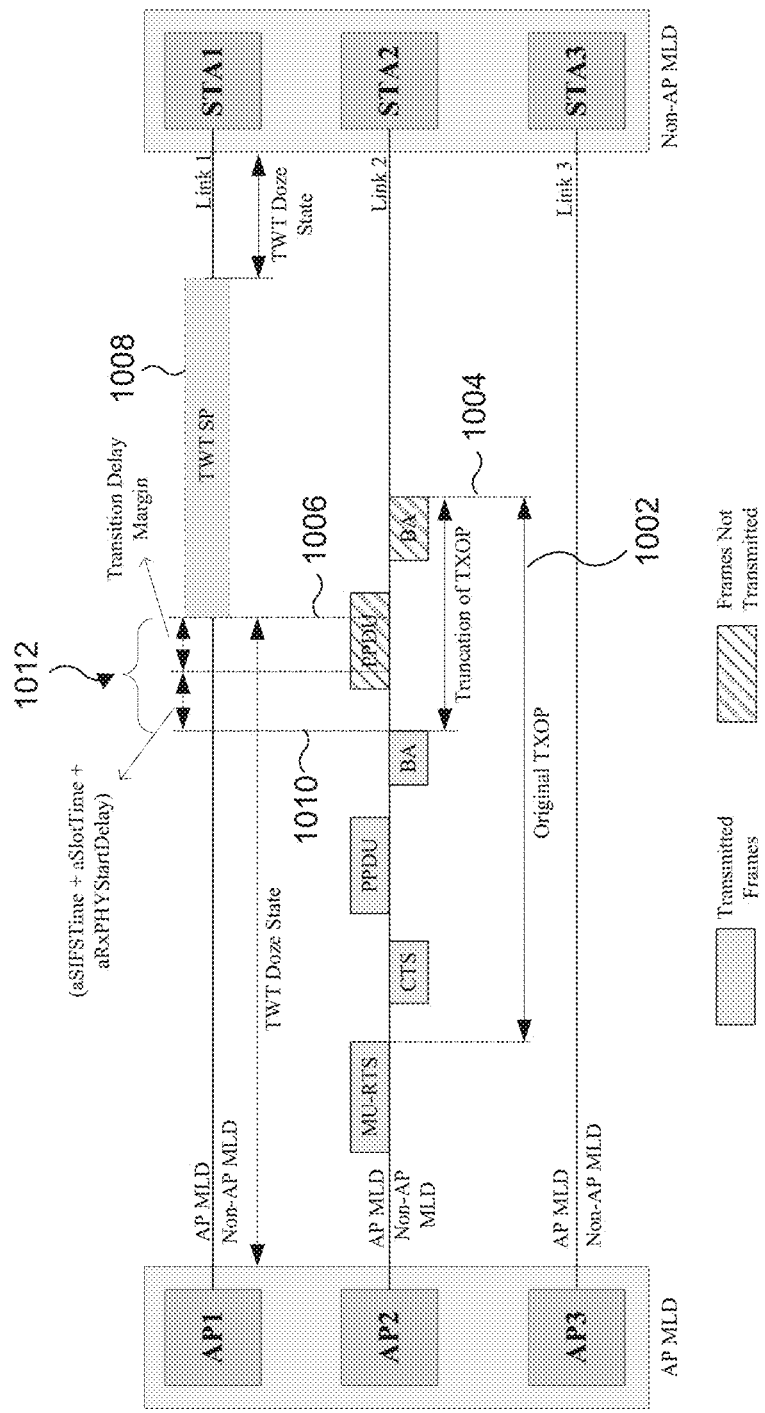
FIG. 10 illustrates an example of ending a TXOP early during EMLSR operation based on overlap with a TWT SP according to embodiments of the present disclosure.

FIG. 10 illustrates an example of ending a TXOP early during EMLSR operation based on overlap with a TWT SP according to embodiments of the present disclosure. In this example, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD— Link 1 between AP1 and STA1, Link 2 between AP2 and STA2, and Link 3 between AP3 and STA3. In this example Link 1, Link 2, and Link 3 are enabled links. In other embodiments, Link 3 could be a disabled link. A TWT agreement/schedule is established on Link 1.

The non-AP MLD of FIG. 10 has transitioned into EMLSR mode, and the AP MLD has initiated a frame exchange sequence with the non-AP MLD. AP2 operating on Link 2 is the TXOP holder for TXOP 1002 on Link 2. The original end time 1004 of TXOP 1002 overlaps in time with the TWT SP 1008 on Link 1. Accordingly, AP2 ends its TXOP 1002 on Link 2 early (at time 1010) before the TWT SP 1004 begins on Link 1 (i.e., before start time 1006 of TWT SP 1008).

In this example, AP2 also ends its TXOP 1002 on Link 2 a threshold amount of time 1012 before the start time 1006 of TWT SP 1008. This threshold amount of time can be the time required for switching link from one link to another for frame exchanges so that the non-AP MLD has sufficient time to switch the necessary radio Tx/Rx chains from the frame exchange link (Link 2) to the TWT link (Link 1). According to one embodiment, this threshold amount of time can be the amount of time indicated in the EMLSR Padding Delay subfield in the EML Capabilities subfield of the Basic Multi-Link element. According to this embodiment, this threshold value can be 0 μs, 32 μs, 64 μs, 128 μs, or 256 μs or 512 μs. According to another embodiment, this threshold amount can be the amount of time indicated in the EMLSR Transition Delay subfield in the EML Capabilities subfield of the Basic Multi-Link element. Other threshold values are also possible.

According to another embodiment for the scenario in which a non-AP MLD is operating in EMLSR mode and a frame exchange sequence is taking place on one of the enabled links (e.g., the second link) between the AP MLD and the non-AP MLD, if a TWT schedule/agreement is set up over another link (e.g., the first link) between the same AP MLD and the non-AP MLD, where the TWT SP on the first link overlaps in time with the frame exchange sequence taking place on the second link, and if, based on the previous embodiment, the AP MLD or the non-AP MLD ends the frame exchange sequence on the second link before the TWT SP starts on the first link, then no initial control frame exchange (e.g., the MU-RTS, CTS, etc.) would be required before transmitting frames on the first link during the TWT SP. Instead, at the beginning of the TWT SP, the STA affiliated with the non-AP MLD operating on the first link can start frame exchanges with its associated AP affiliated with the AP MLD without EMLSR initial control frame exchange for that link.

According to another embodiment for the scenario in which a non-AP MLD is operating in EMLSR mode and a frame exchange sequence is taking place on one of the enabled links (e.g., the second link) between the AP MLD and the non-AP MLD, if a TWT schedule/agreement is set up over another link (e.g., the first link) between the same AP MLD and the non-AP MLD, where the TWT SP on the first link overlaps in time with the frame exchange sequence taking place on the second link, the AP MLD can continue with the frame exchange sequence on the second link if the set of TIDs that are mapped on the first link for the TWT schedule are also mapped on the second link. According to this embodiment, the traffic (including latency sensitive traffic) intended for the non-AP MLD on Link 1 can be transmitted on the second link and the STA operating on the first link can remain in the TWT doze state even during the TWT SP.

Figure 11:
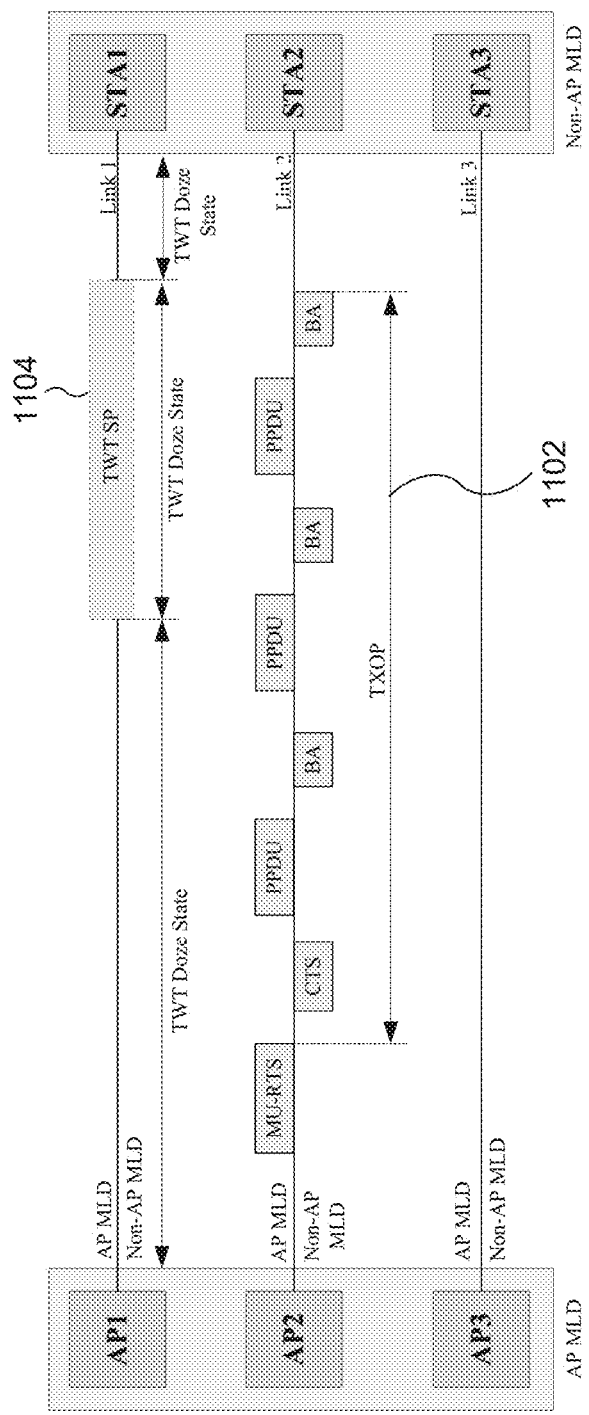
FIG. 11 illustrates an example of continuing an ongoing EMLSR frame exchange during a period in which a TWT SP is scheduled on a different link according to embodiments of the present disclosure.

FIG. 11 illustrates an example of continuing an ongoing EMLSR frame exchange during a period in which a TWT SP is scheduled on a different link according to embodiments of the present disclosure. In this example, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD—Link 1 between AP1 and STA1, Link 2 between AP2 and STA2, and Link 3 between AP3 and STA3. In this example Link 1, Link 2, and Link 3 are enabled links. In other embodiments, Link 3 could be a disabled link. A TWT agreement/schedule is established on Link 1.

The non-AP MLD of FIG. 11 has transitioned into EMLSR mode, and the AP MLD has initiated a frame exchange sequence with the non-AP MLD. AP2 operating on Link 2 is the TXOP holder for TXOP 1102 on Link 2. TXOP 1102 overlaps with TWT SP 1104 on Link 1. However, the set of TIDs that are mapped on Link 1 for the TWT schedule are also mapped on Link 2. Accordingly, the traffic for the non-AP MLD that is intended to be transmitted on Link 1 during the TWT SP can be transmitted on Link 2 during TXOP 1102 as part of the ongoing frame exchange sequence. STA1 is then able to remain in the TWT doze state during TWT SP 1104.

Figure 12:
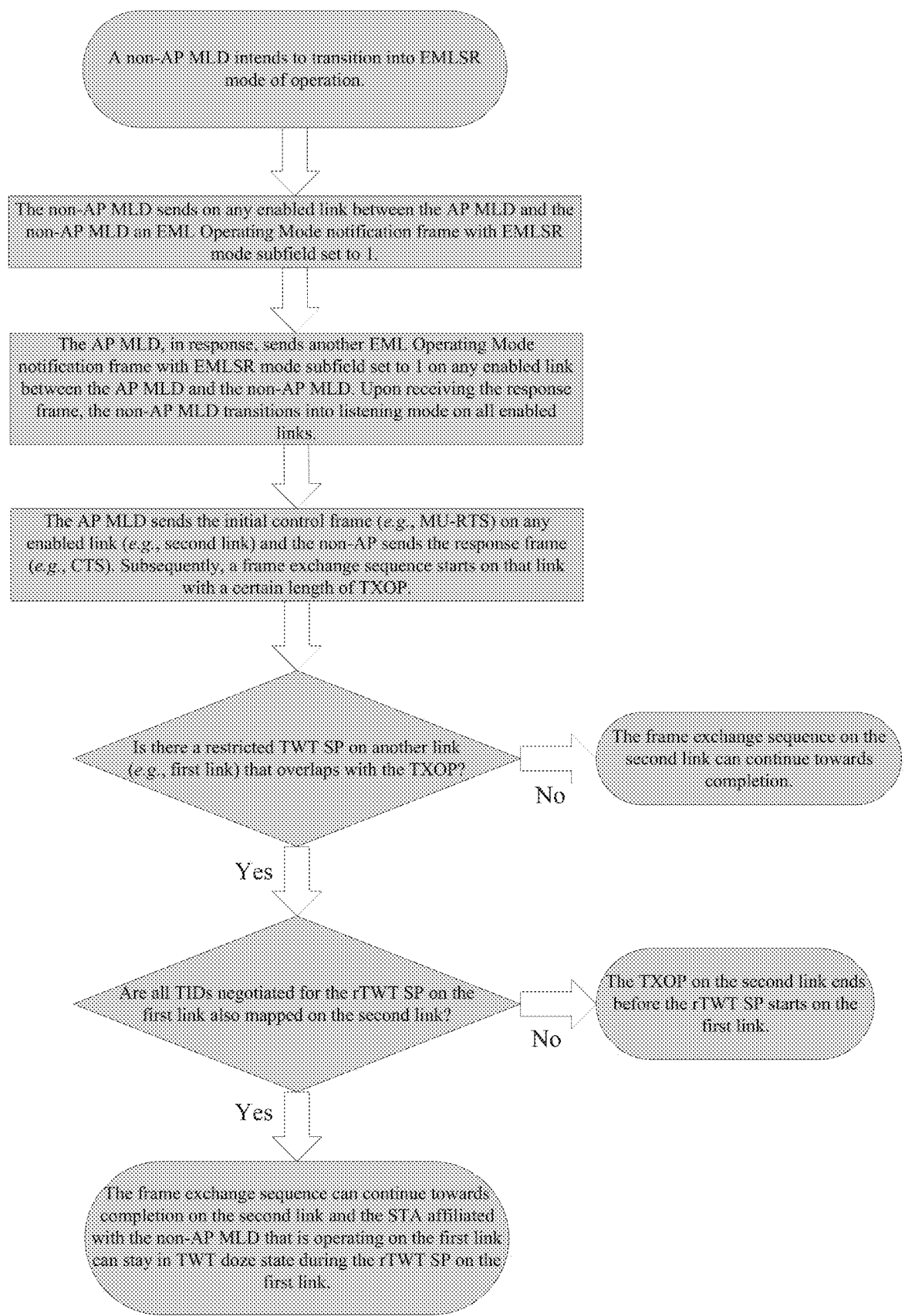
FIG. 12 illustrates an example process for determining whether to continue or end an ongoing EMLSR TXOP on a link when the TXOP overlaps with a scheduled TWT SP on another link according to embodiments of the present disclosure.

FIG. 12 illustrates an example process for determining whether to continue or end an ongoing EMLSR TXOP on a link when the TXOP overlaps with a scheduled TWT SP on another link according to embodiments of the present disclosure. The process of FIG. 12 is one example of a process that may be used to determine whether to end an ongoing EMLSR TXOP that will overlap with a scheduled TWT SP on another link, as illustrated in the example of FIG. 10, or continue the ongoing EMLSR TXOP into the time scheduled for the TWT SP, as illustrated in the example of FIG. 11.

According to other embodiments, when a non-AP MLD is operating in EMLSR mode with its associated AP MLD and an AP affiliated with the AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the non-AP MLD, then the AP affiliated the AP MLD and operating on the second link ends its TXOP before the R-TWT SP starts on the first link.

According to another embodiment, in the above scenario, the AP ends its TXOP on the second link a threshold amount of time before the R-TWT SP starts on the first link. This threshold amount of time can be the time required for switching the link from one link to another for frame exchanges so that the non-AP MLD has sufficient time to switch necessary radio Tx/Rx chains from the first link to the R-TWT link (the first link). According to one embodiment, this threshold amount of time can be the amount of time indicated in the EMLSR Padding Delay subfield in the EML Capabilities subfield of the Basic Multi-Link element. According to this embodiment, this threshold value can be 0 µs, 32 µs, 64 µs, 128 µs, or 256 µs or 512 µs. According to another embodiment, this threshold amount can be the amount of time indicated in the EMLSR Transition Delay subfield in the EML Capabilities subfield of the Basic Multi-Link element. Other threshold values are also possible.

According to one embodiment, when a non-AP MLD is operating in EMLSR mode with its associated AP MLD and a STA affiliated with the non-AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the non-AP MLD, then the STA affiliated the non-AP MLD and operating on the second link ends its TXOP before the R-TWT SP starts on the first link.

According to another embodiment, in the above scenario, the STA ends its TXOP on the second link a threshold amount of time before the R-TWT SP starts on the first link. This threshold amount of time can be the time required for switching link from one link to another for frame exchanges so that the non-AP MLD has sufficient time to switch necessary radio Tx/Rx chains from the first link to the R-TWT link (the first link). This threshold value can be one of the values indicated in the previous embodiment.

According to one embodiment, when a non-AP MLD intends to operate in EMLSR mode with an AP MLD, if an R-TWT schedule is established on one of the EMLSR links between the AP MLD and the non-AP MLD, then the STA affiliated with the non-AP MLD and operating on the link on which the R-TWT schedule has been established is exempt from the requirement of being in listening mode after the non-AP MLD successfully transmits the EML Operating Mode Notification frame on one of the EMLSR links and the transition delay indicated in the Transition Timeout subfield in the EML Capabilities subfield in the Basic Multi-Link element has expired, or after receiving an EML Operating Mode Notification frame from the AP MLD, or after the end of frame exchanges on any of the EMLSR links, or after the time duration indicated in the EMLSR Transition Delay subfield after the end of TXOP in the case in which a STA affiliated with the non-AP MLD is the initiator of the TXOP.

According to one embodiment, when a non-AP MLD is operating in EMLSR mode with an AP MLD and an R-TWT schedule is established on one of the EMLSR links between the AP MLD and the non-AP MLD, then an AP affiliated with the AP MLD may initiate a frame exchange on that link without transmitting the initial control frame to the R-TWT scheduled STA affiliated with the non-AP MLD and operating on that link.

According to one embodiment, when a non-AP MLD is operating in EMLSR mode with an AP MLD and multiple R-TWT schedules are established on multiple links between the AP MLD and the non-AP MLD, if those links are also included in the EMLSR links and if the R-TWT SP on one link (e.g., the first link) overlaps, in time, with the R-TWT SP on another link (e.g., the second link), then the non-AP MLD disables the EMLSR mode before the overlapping TWT SP starts on either of the links.

According to another embodiment for the above-described scenario, instead of disabling the EMLSR link before the overlapping R-TWT SPs start, the non-AP MLD may select one of the two R-TWT SP on one of the two links for frame exchanges on the selected link during the R-TWT SP on that link. According to one embodiment of this scenario, the non-AP MLD can send some signaling to the AP MLD over any of the enabled links between the AP MLD and the non-AP MLD to indicate which R-TWT link out of the two links has been selected for the frame exchange. Such signaling can be performed with a frame that can contain the link ID information of the R-TWT link that has been selected, Broadcast TWT ID of the selected R-TWT schedule, etc. For example, a control frame, R-TWT SP Indicator, can be used for this purpose.

FIG. 13 illustrates an example format of an R-TWT Link Selection frame according to embodiments of the present disclosure. The Broadcast TWT ID subfield in the R-TWT Link Selection frame indicates the Broadcast TWT ID of the R-TWT schedule of the link that has been selected out of the overlapping R-TWT SP links for EMLSR frame exchange. The Selected Link ID subfield in the R-TWT Link Selection frame indicates the link ID of the link that has been selected out of the overlapping R-TWT SP links for EMLSR frame exchange.

According to another embodiment, the link corresponding to the R-TWT SP (out of the multiple overlapping R-TWT SPs) that starts earlier than the other R-TWT SPs is selected for the EMLSR link. According to another embodiment, the link corresponding to the R-TWT SP (out of the multiple overlapping R-TWT SPs) that has longer SP duration than the other R-TWT SPs is selected for the EMLSR link.

According to another embodiment, the link corresponding to the R-TWT SP (out of the multiple overlapping R-TWT SPs) that has higher priority TIDs negotiated during the R-TWT setup phase than the other R-TWT SPs is selected for the EMLSR link. If both links have the same set of TIDs negotiated, then according to one embodiment, the SP that has a higher (or lower) Broadcast TWT ID value is selected. According to another embodiment, the first check would be to see which R-TWT SP has higher priority. If all of the overlapping SPs have the same priority, then the second check for selecting the SP can be based on any of the previously mentioned methods.

According to other embodiments for the above mentioned scenario, the AP MLD can also make the selection of the R-TWT SP and can indicate the selected link to the non-AP MLD based on any of the methods described in the previous embodiments.

According to one embodiment, when a non-AP MLD is operating in EMLSR mode with its associated AP MLD and an AP affiliated with the AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the same non-AP MLD, then the AP affiliated with the AP MLD and operating on the second link may continue its transmission on the second link regardless of the R-TWT SP start time on the first link. Upon observing that the downlink transmission hasn't stopped on the second link, the STA affiliated with the non-AP MLD and operating on the first link may remain in doze state even during its scheduled R-TWT SP duration. According to another embodiment, in the above scenario, the AP affiliated with the AP MLD and operating on the second link may continue its transmission on the second link if that AP has downlink latency-sensitive traffic for the STA affiliated with the non-AP MLD and operating on the second link.

According to one embodiment, when a non-AP MLD is operating in EMLSR mode with its associated AP MLD and a STA affiliated with the non-AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the same non-AP MLD, then the STA affiliated the non-AP MLD and operating on the second link may continue its transmission on the second link regardless of the R-TWT SP start time on the first link. According to this embodiment, because of the on-going transmission on the second link, the STA affiliated with the non-AP MLD and operating on the first link may remain in doze state even during its scheduled R-TWT SP duration. According to another embodiment, in the above scenario, the STA affiliated with the non-AP MLD and operating on the second link may continue its transmission on the second link if that STA has uplink latency-sensitive traffic for the AP affiliated with the AP MLD and operating on the second link.

According to one embodiment, when a non-AP MLD is operating in EMLSR mode with an AP MLD, and an AP affiliated with the AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the same non-AP MLD, then the AP affiliated with the AP MLD and operating on the second link should end its TXOP at least an amount of time indicated in the EMLSR Padding Delay subfield in the EML Capabilities subfield of the Basic Multi-Link element before the R-TWT SP starts on the first link if the TIDs (one or more) that are negotiated for the R-TWT schedule on the first link are not mapped on the second link through TID-to-Link mapping.

According to one embodiment, when a non-AP MLD is operating in EMLSR mode with an AP MLD, and a STA affiliated with the non-AP MLD and operating on one of the EMLSR links (e.g., the second link) between the AP MLD and the non-AP MLD is the TXOP holder on that link, if an R-TWT schedule is established on another EMLSR link (e.g., the first link)—or on any link if the non-AP MLD is a single radio device—between the same AP MLD and the non-AP MLD, then the STA affiliated with the non-AP MLD and operating on the second link should end its TXOP at least an amount of time indicated in the EMLSR Padding Delay subfield in the EML Capabilities subfield of the Basic Multi-Link element before the R-TWT SP starts on the first link if the TIDs (one or more) that are negotiated for the R-TWT schedule on the first link are not mapped on the second link through TID-to-Link mapping.

According to one embodiment, when a non-AP MLD is operating in EMLSR mode with an AP MLD and an R-TWT schedule is established on one of the EMLSR links between the AP MLD and the non-AP MLD, then an AP affiliated with the AP MLD may initiate a frame exchange on that link during the R-TWT SP on that link without transmitting the initial control frame to the R-TWT scheduled STA affiliated with the non-AP MLD and operating on that link.

Figure 14:
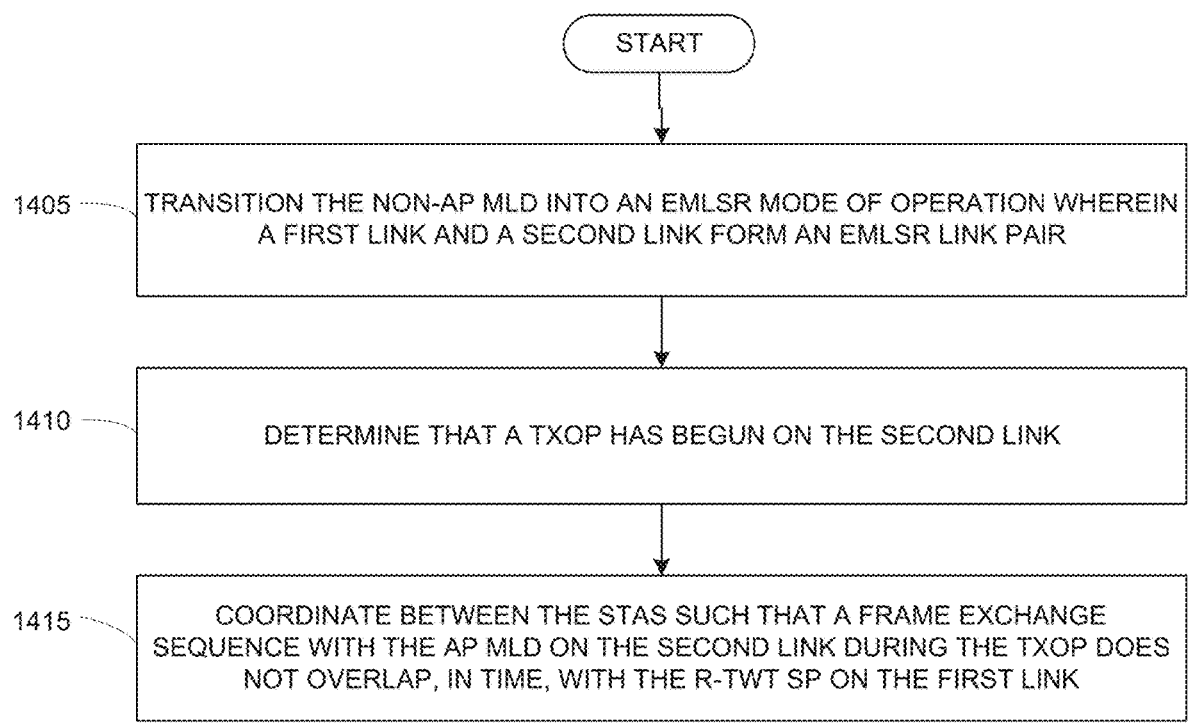
FIG. 14 illustrates an example process for facilitating the coexistence of TWT operation and EMLSR operation for MLDs in a WLAN according to various embodiments of the present disclosure.

FIG. 14 illustrates an example process for facilitating the coexistence of TWT operation and EMLSR operation for MLDs in a WLAN according to various embodiments of the present disclosure. The process of FIG. 14 is discussed as being performed by a non-AP MLD, but it is understood that a corresponding AP MLD performs a corresponding process. It is further understood that these roles could be reversed, and the process of FIG. 14 could be performed with the AP MLD. Additionally, for convenience the process of FIG. 14 is discussed as being performed by a WI-FI non-AP MLD comprising a plurality of STAs that each comprise a transceiver configured to configured to form a link with a corresponding AP affiliated with a WI-FI AP MLD. Furthermore, an R-TWT schedule is established for communications on a first one of the links such that a first one of the STAs that operates on the first link is a member of an R-TWT SP on the first link, and a second one of the STAs that operates on a second one of the links is not a member of any other R-TWT SP on the second link that overlaps, in time, with the R-TWT SP on the first link. However, it is understood that any suitable wireless communication device could perform these processes.

Referring to FIG. 14, the process begins with the non-AP MLD determining to transition the non-AP MLD into an EMLSR mode of operation (step 1405), wherein the first link and the second link form an EMLSR link pair. In some embodiments, after the transition into the EMLSR mode, if the first link is in the R-TWT SP, then the non-AP MLD transitions the first link into an EMLSR listening mode, allows the first link to enter a TWT doze state after the R-TWT SP has ended, and transitions the remaining links into the EMLSR listening mode.

After the transition into the EMLSR mode at step 1405, the non-AP MLD may, in some embodiments, carry out EMLSR operations with the AP MLD on a subset of the links (e.g., an EMLSR link set). In some such embodiments, if the R-TWT schedule is established on the first link then the first link is not included in the subset.

Next, the non-AP MLD determines that a TXOP has begun on the second link (step 1410). The non-AP MLD then coordinates between the STAs such that a frame exchange sequence with the AP MLD on the second link during the TXOP does not overlap, in time, with the R-TWT SP on the first link (step 1415).

In some embodiments, if the second STA operates on the second link as a TXOP holder on the second link, then at step 1415 the non-AP MLD coordinates between the STAs such that the second STA ends the TXOP on the second link before the R-TWT SP begins on the first link. If the TXOP on the second link has been ended, the non-AP MLD may begin a second frame exchange sequence during the R-TWT SP on the first link without an EMLSR initial control frame exchange being performed for the first link.

In some other embodiments in which the second STA operates on the second link as a TXOP holder on the second link, at step 1415 the non-AP MLD coordinates between the STAs such that the second STA ends the TXOP on the second link no later than a threshold amount of time before the R-TWT SP starts on the first link. This threshold amount can be equal to an EMLSR transition delay value, indicated in an EMLSR Transition Delay subfield of a Basic Multi-Link element, as specified for the EMLSR link pair.

In some embodiments, when a set of TIDs that are mapped on the first link for the R-TWT schedule are also mapped on the second link, then at step 1415 the non-AP MLD allows the first link to remain in a TWT doze state during the R-TWT SP, and allows at least one of the transceivers to transmit, to the AP MLD on the second link as part of the frame exchange sequence, traffic that corresponds to the set of TIDs.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) associated with a wireless network, the non-AP MLD comprising:
   a first non-AP station (STA) affiliated with the non-AP MLD, the first non-AP STA operating on a first link with a first AP affiliated with an AP MLD, wherein a restricted target wake time (R-TWT) schedule is established on the first link;
   a second non-AP STA affiliated with the non-AP MLD, the second non-AP STA operating on a second link with a second AP affiliated with the AP MLD, where a frame exchange takes place on the second link during a transmission opportunity (TXOP); and
   a processor coupled to the first non-AP STA and the second non-AP STA, the processor configured to:
   operate with the AP MLD in an enhanced multi-link single radio (EMLSR) mode on the first link and the second link, and
   coordinate between the second non-AP STA and the second AP such that the TXOP on the second link ends no later than a threshold amount of time before a R-TWT service period (SP) starts on the first link.

2. The non-AP MLD of claim 1, wherein the first non-AP STA is a member of the R-TWT SP on the first link, and the second non-AP STA is not a member of any R-TWT SP on the second link that overlaps with the R-TWT SP on the first link.

3. The non-AP MLD of claim 1, wherein the processor is configured to coordinate between the second non-AP STA and the second AP such that the second non-AP STA ends the TXOP on the second link no later than the threshold amount of time before the R-TWT SP starts on the first link if the second non-AP STA is a TXOP holder on the second link.

4. The non-AP MLD of claim 1, wherein the processor is configured to coordinate between the second non-AP STA and the second AP such that the second AP ends the TXOP on the second link no later than the threshold amount of time before a R-TWT SP starts on the first link if the second AP is a TXOP holder on the second link.

5. The non-AP MLD of claim 1, wherein the threshold amount of time is equal to a EMLSR transition delay that is indicated in a EMLSR Transition Delay subfield in the EML Capabilities subfield of the Basic Multi-Link element.

6. The non-AP MLD of claim 1, wherein the threshold amount of time is equal to a time required by the non-AP MLD for switching from exchanging frames on the second link to a EMLSR listening mode on the first link.

7. The non-AP MLD of claim 1, wherein the R-TWT SP on the first link overlaps in time with frame exchange sequence to take place on the second link.

8. The non-AP MLD of claim 1, wherein the processor is configured to coordinate between the second non-AP STA and the second AP such that frame exchange continues on the second link if a set of traffic identifiers (TIDs) negotiated for the R-TWT SP on the first link are mapped on the second link for the frame exchange.

9. The non-AP MLD of claim 1, wherein the first link and the second link forms a pair of EMLSR link.

10. An access point (AP) multi-link device (MLD) associated with a wireless network, the AP MLD comprising:
a first AP affiliated with the AP MLD, the first AP operating on a first link with a first non-AP station (STA) affiliated with a non-AP MLD, wherein a restricted target wake time (R-TWT) schedule is established on the first link;
a second AP affiliated with the AP MLD, the second AP operating on a second link with a second non-AP STA affiliated with the non-AP MLD, wherein a frame exchange takes place on the second link during a transmission opportunity (TXOP); and
a processor coupled to the first AP and the second AP, the processor configured to:
operate with the non-AP MLD in an enhanced multi-link single radio (EMLSR) mode on the first link and the second link, and
coordinate between the second AP and the second non-AP STA such that the TXOP on the second link ends no later than a threshold amount of time before a R-TWT service period (SP) starts on the first link.

11. The AP MLD of claim 10, wherein the first non-AP STA is a member of the R-TWT SP on the first link, and the second non-AP STA is not a member of any R-TWT SP on the second link that overlaps with the first SP.

12. The AP MLD of claim 10, wherein the processor is configured to coordinate between the second AP and the second non-AP STA such that the second AP ends the TXOP on the second link no later than a threshold amount of time before a R-TWT SP starts on the first link if the second AP is a TXOP holder on the second link.

13. The AP MLD of claim 10, wherein the threshold amount of time is equal to a EMLSR transition delay that is indicated in a EMLSR Transition Delay subfield in the EML Capabilities subfield of the Basic Multi-Link element.

14. The AP MLD of claim 10, wherein the threshold amount of time is equal to a time required by the non-AP MLD for switching from exchanging frames on the second link to a EMLSR listening mode on the first link.

15. The AP MLD of claim 10, wherein the processor is configured to coordinate between the second AP and the second non-AP STA such that frame exchange continues on the second link if a set of traffic identifiers (TIDs) negotiated for the R-TWT SP on the first link are mapped on the second link for the frame exchange.

16. A method for a non-access point (AP) multi-link device (MLD) associated with a wireless network, the method comprising:
operating with an AP MLD in an enhanced multi-link single radio (EMLSR) mode on the first link and the second link, the first link being set up between a first non-AP station (STA) affiliated with the non-AP MLD and a first AP affiliated with the AP MLD, the second link being set up between a second non-AP STA affiliated with the non-AP MLD and a second AP affiliated with the AP MLD; and
coordinating between the second non-AP STA and the second AP such that a transmission opportunity (TXOP) on the second link ends no later than a threshold amount of time before a restricted target wake time (R-TWT) service period (SP) starts on the first link, wherein the first non-AP STA is a member of the R-TWT SP on the first link, and a frame exchange takes place on the second link during the TXOP.

17. The method of claim 16, wherein the second non-AP STA ends the TXOP on the second link no later than the threshold amount of time before the R-TWT SP starts on the first link if the second non-AP STA is a TXOP holder on the second link.

18. The method of claim 16, wherein the threshold amount of time is equal to a time required by the non-AP MLD for switching from exchanging frames on the second link to a EMLSR listening mode on the first link.

19. The method of claim 16, further comprising:
coordinating between the second non-AP STA and the second AP such that the frame exchange continues on the second link if a set of traffic identifiers (TIDs) negotiated for the R-TWT SP on the first link are mapped on the second link for the frame exchange.

20. The method of claim 16, wherein the R-TWT SP on the first link overlaps in time with frame exchange sequence to take place on the second link.

* * * * *